United States Patent
Dawson

[19]

[11] Patent Number: 6,006,506
[45] Date of Patent: Dec. 28, 1999

[54] MOWER CHUTE SUPPORT

[76] Inventor: Paul E. Dawson, 1600 Callaway Dr., Lenoir City, Tenn. 37772

[21] Appl. No.: 09/052,261

[22] Filed: Mar. 31, 1998

[51] Int. Cl.[6] .................................................. A01D 35/22
[52] U.S. Cl. ............................................. 56/320.2; 56/202
[58] Field of Search ............................... 56/202, DIG. 9, 56/DIG. 20, 320.1, 320.2, 1, 12.1, 16.8; 237/DIG. 6

[56] References Cited

U.S. PATENT DOCUMENTS

| | | | |
|---|---|---|---|
| 2,274,794 | 3/1942 | Kitchen | 248/352 |
| 3,099,123 | 7/1963 | Price | 56/202 |
| 3,721,078 | 3/1973 | Haffner | 56/202 |
| 3,797,214 | 3/1974 | Erdman et al. | 56/320.2 |
| 3,805,499 | 4/1974 | Woelffer et al. | 56/202 |
| 4,008,559 | 2/1977 | Lessig, III et al. | 56/320.2 |
| 4,041,682 | 8/1977 | Kidd | 56/320.2 |
| 4,466,235 | 8/1984 | Cole | 56/16.9 |
| 4,800,712 | 1/1989 | Morse et al. | 56/202 |
| 5,195,311 | 3/1993 | Holland | 56/320.2 |
| 5,826,417 | 10/1998 | Evans | 56/320.2 |

*Primary Examiner*—Robert E. Pezzuto
*Attorney, Agent, or Firm*—Luedeka, Neely & Graham, PC

[57] ABSTRACT

A support for use with a mower for maintaining a discharge chute hingedly connected to a deck of the mower adjacent a discharge opening of the deck in a raised position when the mower is not running. The support includes a base having substantially flat upper and lower surfaces, and a front edge opposite a back edge. A pair of spaced apart pins extend perpendicular away from the lower surface of the base, the pins being spaced and configured for being matingly received into apertures located of the deck of the mower. An upstanding member extends perpendicularly away from the upper surface of the base for abutting the chute of the mower when it is in the raised position for maintaining the chute in the raised position when the support is installed on the mower.

15 Claims, 5 Drawing Sheets

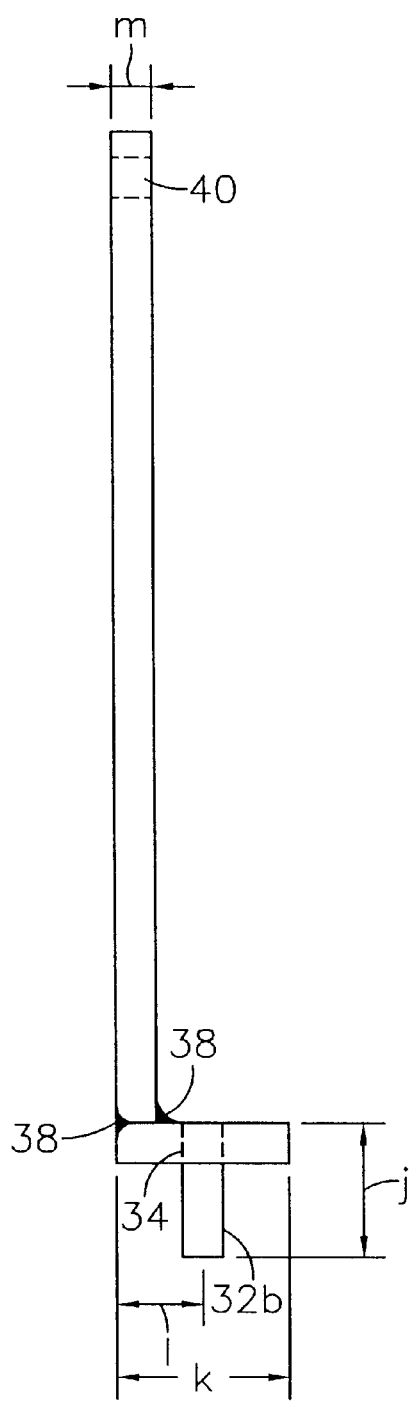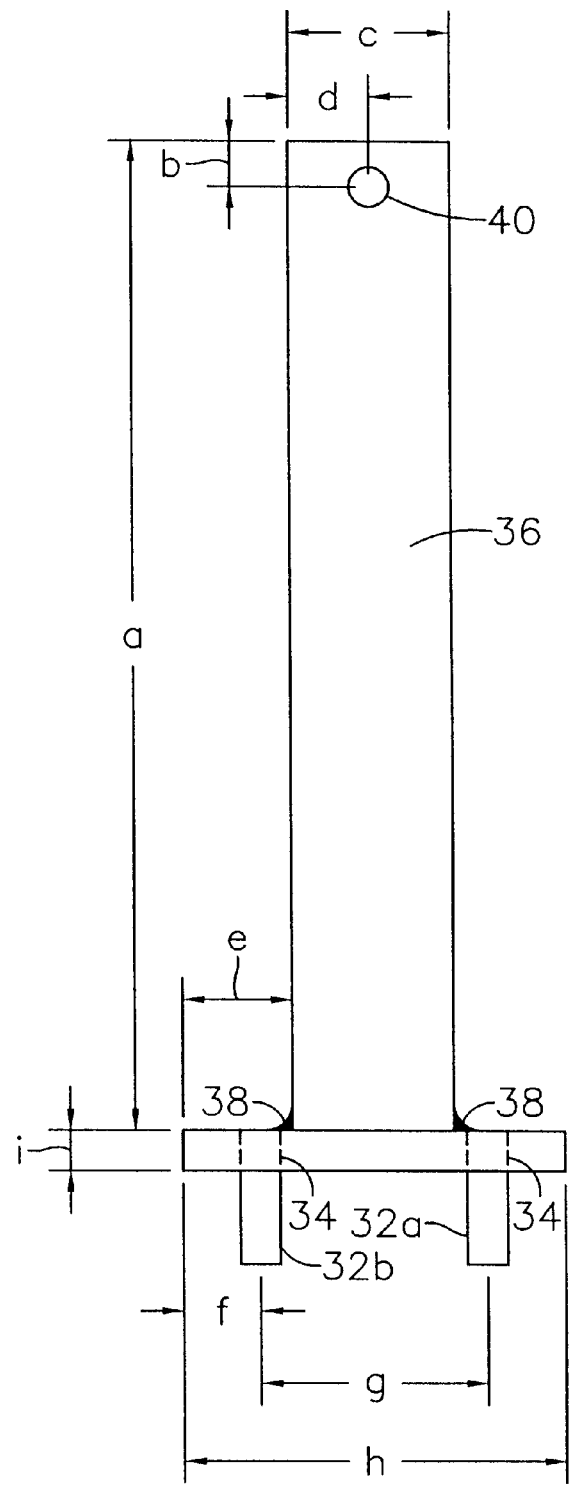
*Fig. 3*  *Fig. 4* ific notation: 6,006,506

MOWER CHUTE SUPPORT

FIELD OF THE INVENTION

This invention relates generally to devices for use with mowers. More particularly, the invention relates to devices for use with mowers of the type having chutes for directing the expulsion of clippings from the mower.

BACKGROUND AND SUMMARY OF THE INVENTION

Mowers typically include a chute, generally of plastic, adjacent an opening of the cutting deck for downwardly directing expelled clippings. The chutes are typically mounted using hinges to allow the chute to be lifted upwardly, with springs adjacent the hinges biasing the chute to remain in the down position. The chute must remain in the down position when the mower is running to protect users and bystanders from hazards associated with the blade and from contact with expelled clipping, rocks and the like.

It is however necessary in some situations to maintain the chute in a raised position, always with the mower turned off, such as when the mower is to be moved through an opening that is narrower than the width of the mower with the chute in the lowered position or for performing maintenance on the mower. For example, when loading (or unloading) the mower onto a truck or passing the mower through a gate or door of a storage building, the chute must be raised to provide clearance. Also, when cleaning the deck of the mower or removing or replacing the blade, lifting of the chute enables the necessary access.

The chute is commonly maintained in the raised position as by tying with wire, string or the like. This is inconvenient and desires improvement.

Accordingly it is an object of the present invention to provide a device for maintaining a mower chute in a raised or upright position.

A further object of the present invention is to provide a device of the character described that avoids the need to tie the chute with wire or the like.

A still further object of the invention is to provide a device of the character described which may be installed without requiring modification of the mower.

Still another object of the present invention is to provide a device of the character described which is uncomplicated in construction and is economical and convenient to use.

With regard to the foregoing and other objects, the present invention is directed to a support for use with a mower for maintaining a discharge chute hingedly connected to a deck of the mower adjacent a discharge opening of the mower in a raised position when the mower is not running.

In a preferred embodiment, the support includes a base having substantially flat upper and lower surfaces, and a front edge opposite a back edge. A pair of spaced apart pins extend away from the lower surface of the base, the pins being spaced and configured for being matingly received into apertures located on the deck of the mower. An upstanding member extends away from the upper surface of the base. When the upstanding member is installed, it abuts the chute of the mower when the chute is in the raised position and maintains the chute in the raised position.

In another aspect, the support includes a base having substantially flat upper and lower surfaces, and a front edge opposite a back edge and structure integral with the base and configured for maintaining the base adjacent the deck of the mower.

An upstanding member extends away from the upper surface of the base for abutting the chute of the mower when it is in the raised position for maintaining the chute in the raised position when the support is installed on the mower.

A significant feature of the invention is the provision of a support that is uncomplicated in configuration that enables maintenance of a mower chute in a raised position when the mower is not in use. The support is particularly suitable to raise the chute as for unloading of a mower from a truck or for passage of the mower through a narrow gate, both situations which typically involve the chute preventing passage of the mower unless the chute is held up manually or tied using wire or string or the like. The support also adapts readily to mowers, usually without need for any modification or, in some cases, with only very minor modification, such as the drilling of small apertures. The support is also readily removed by simply lifting the support away from the mower deck. Thus, installation and removal can each be done without the need for tools and in a matter of only a few seconds.

BRIEF DESCRIPTION OF THE DRAWINGS

The above and other features and advantages of the present invention will become further known from the following detailed description considered in conjunction with the accompanying drawings in which:

FIG. 3 is a left-side view of the chute support of FIG. 2.

FIG. 4 is a front plan view of the chute support of FIG. 2.

DETAILED DESCRIPTION

Figure 1:
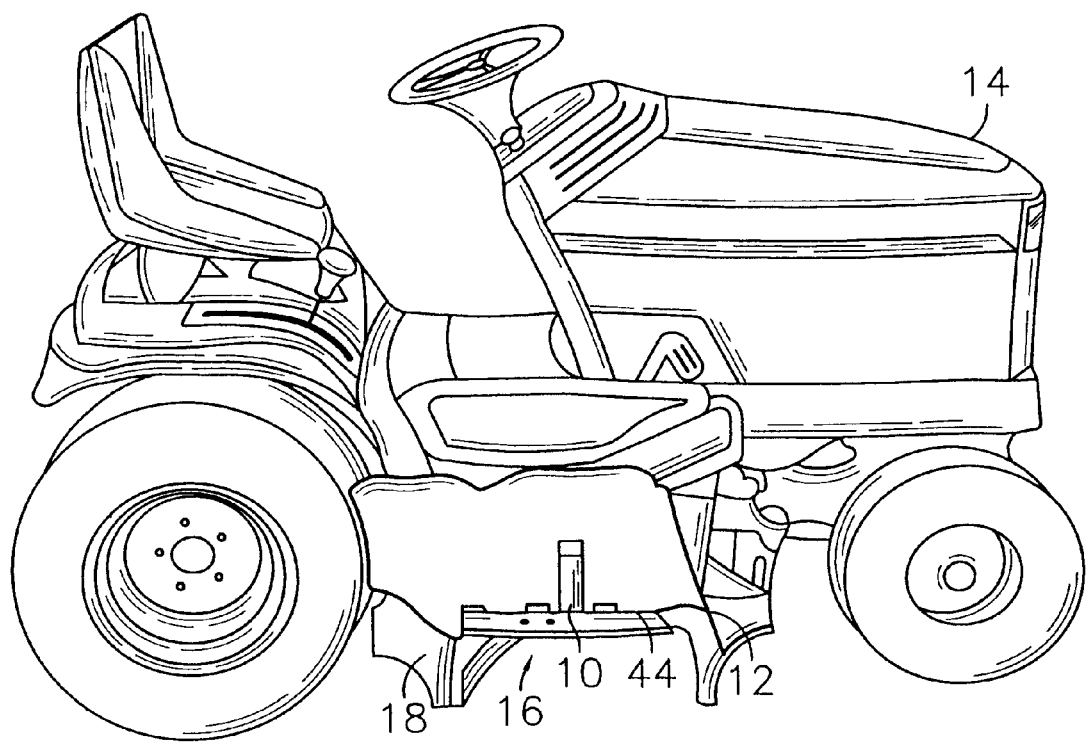
FIG. 1 is a perspective view showing a chute support in accordance with the invention installed on a riding mower.

With initial reference to FIG. 1, there is shown a removable chute support 10 in accordance with one embodiment of the invention for maintaining a chute 12 of a riding mower 14 in a raised position when the mower is turned off. As will be appreciated, the ability to selectively maintain the chute in a raised position is desirable in many situations when the mower is to be moved through an opening that is narrower than the width of the mower with the chute in the lowered position, such as when loading (or unloading) the mower onto a truck or passing the mower through a gate or door of a storage building. In addition, it is also desirable to enable the chute to be positioned in a raised or upright position for maintenance of the mower, such as when cleaning the deck of the mower or removing or replacing the blade.

The chute 12 is generally characterized by a plastic part having a generally U-shaped, commonly tapered, cross-section that covers an opening 16 of a generally metal deck 18 of the mower that surrounds a blade or blades of the mower 14 used to cut grass and the like. In this regard, it is noted that the chute 12 is generally attached to the deck 18 as by one or more spring hinges 19 attached to the deck and the chute 12 along the edge of the chute that faces the mower 14. The hinges bias the chute to a lowered position such that the chute 12 substantially covers the opening 16 of the deck to protect persons from encountering the blade and to direct grass clippings and the like that are discharged through the opening in a generally downward direction.

The hinges also permit the chute to be raised, such as for attaching a grass catcher or for gaining access to the opening 16 for removing the blades or other maintenance. In this regard, a pair of apertures 20a and 20b are commonly provided through the thickness of the deck 18 adjacent a central edge location of the opening 16 to receive attachment members of a grass catcher. The apertures are commonly circular in cross-section.

The chute support 10 of the present invention is preferably configured to install on the deck of the mower using pre-existing apertures 20a and 20b such that the support 10 is centrally located adjacent the opening and no modification of the mower is typically necessary. As will be appreciated, this is advantageous in that it avoids the need to modify the mower in any manner and also provides a safeguard against accidental usage of the chute support in combination with the grass catcher. That is, it is necessary to remove the chute support 10 in order to install the grass catcher, as both install with use of the apertures 20a and 20b. However, in the event pre-existing apertures are not available, suitable apertures may readily be installed as by drilling suitable apertures through the deck of the mower at the desired locations.

Figure 2:
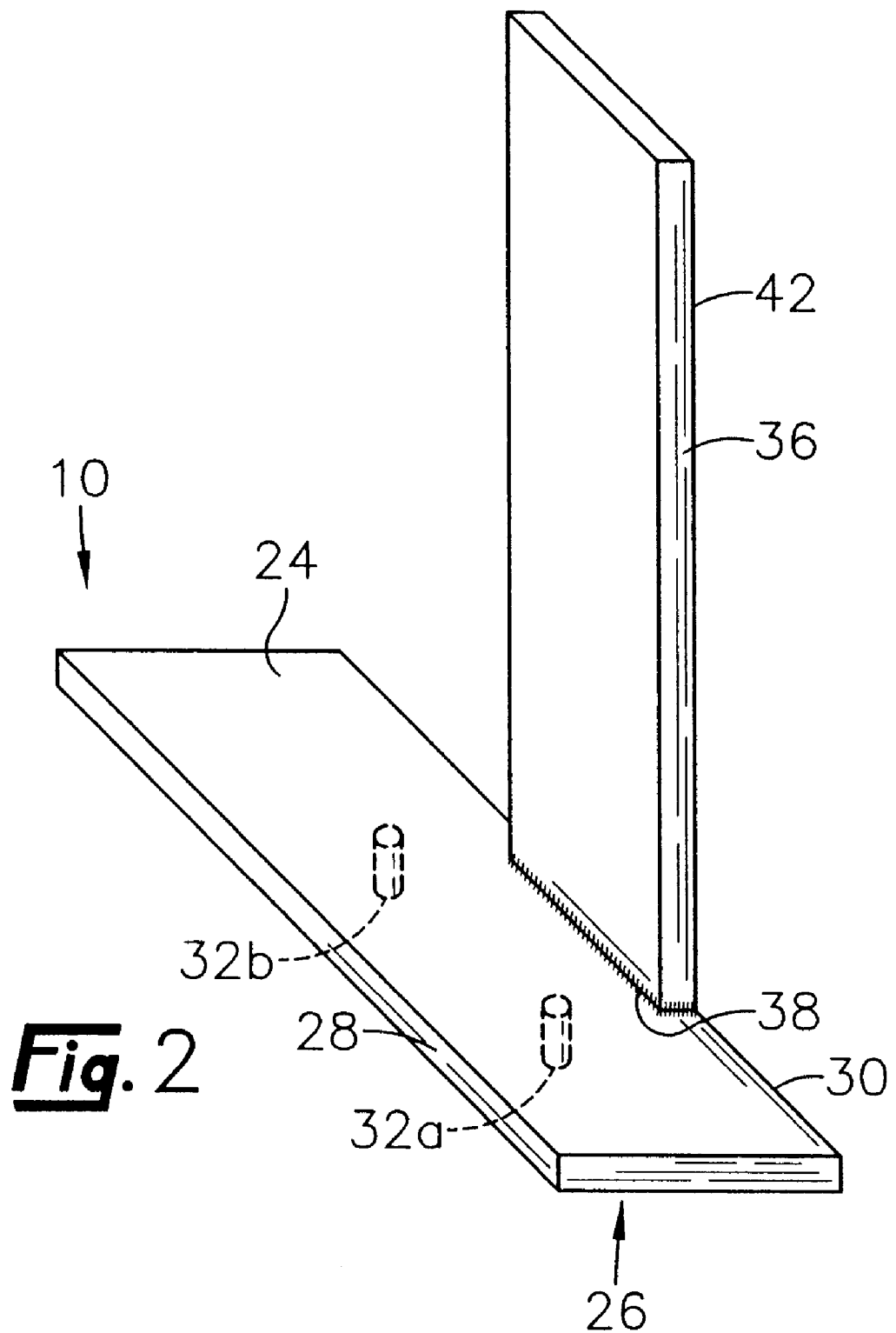
FIG. 2 is a perspective view of the chute support of FIG. 1.

The chute support 10 is preferably manufactured of a strong material such as steel, preferably powder coated to avoid rusting. However, it will be understood that the support 10 may also be made of other strong rigid materials such as plastics. Turning now to FIGS. 2–4, the chute support 10 preferably includes a base 22 having substantially flat upper and lower surfaces 24 and 26, and a front edge 28 opposite a back edge 30. A pair of spaced apart pins 32a, 32b extend away from the lower surface 26, preferably perpendicular to the lower surface 26. The pins 32a, 32b are preferably spaced and configured for being matingly received into the apertures 20a and 20b of the deck 18 for installation of the support 10 thereon. In the case of a metal support 10, the pins 32a, 32b are preferably seated into corresponding blind bores 34 drilled into the lower surface 26 and secured therein as by welding. As noted above, the pins 32a, 32b are configured to be fittingly received into the apertures 20a and 20b. Thus, in the case of circular apertures, the pins 32a, 32b are also preferably circular in cross-section. However, if the apertures 20a and 20b are of other configuration, e.g., square, then the pins 32a, 32b will preferably be of like configuration so that they mate with the apertures.

An upstanding member 36 is attached to the upper surface 24 of the base 22, as by welds 38. The member 36 extends perpendicular to and away from the surface 24 and is configured for abutting or otherwise contacting the chute 12 to maintain it in a raised position when the support 10 is installed on the mower 14. If desired, a plastic or rubber tip may be provided on the upper end of the member 36 to cover the corners and provide a smooth surface for grasping by a user. Also, an aperture 40 may be provided through the thickness of the member 36 as for hanging of the support from a hook on a wall when the support is not in use. When the support 10 is installed on the mower 14, a back surface 42 of the support 10 faces bottom surface 44 of the chute 12.

Figure 2B:
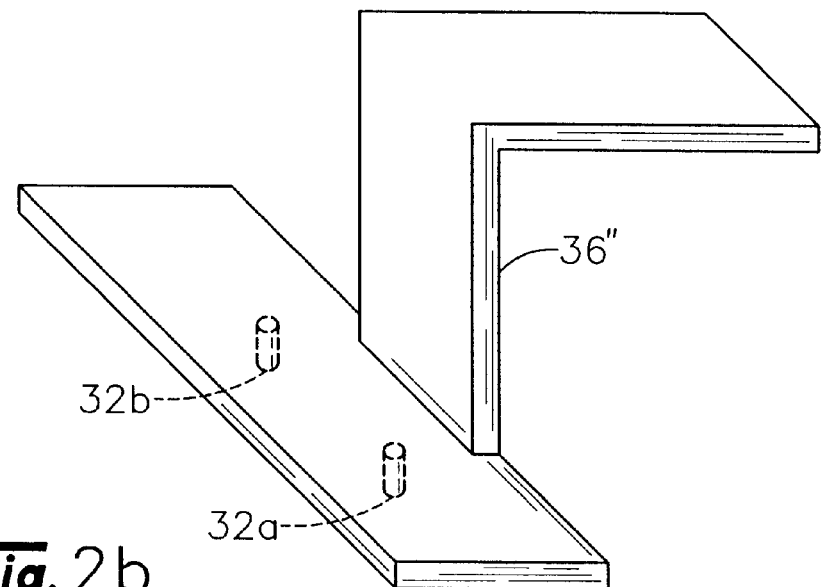
FIGS. 2a and 2b show other embodiments of the chute support.
Figure 2A:
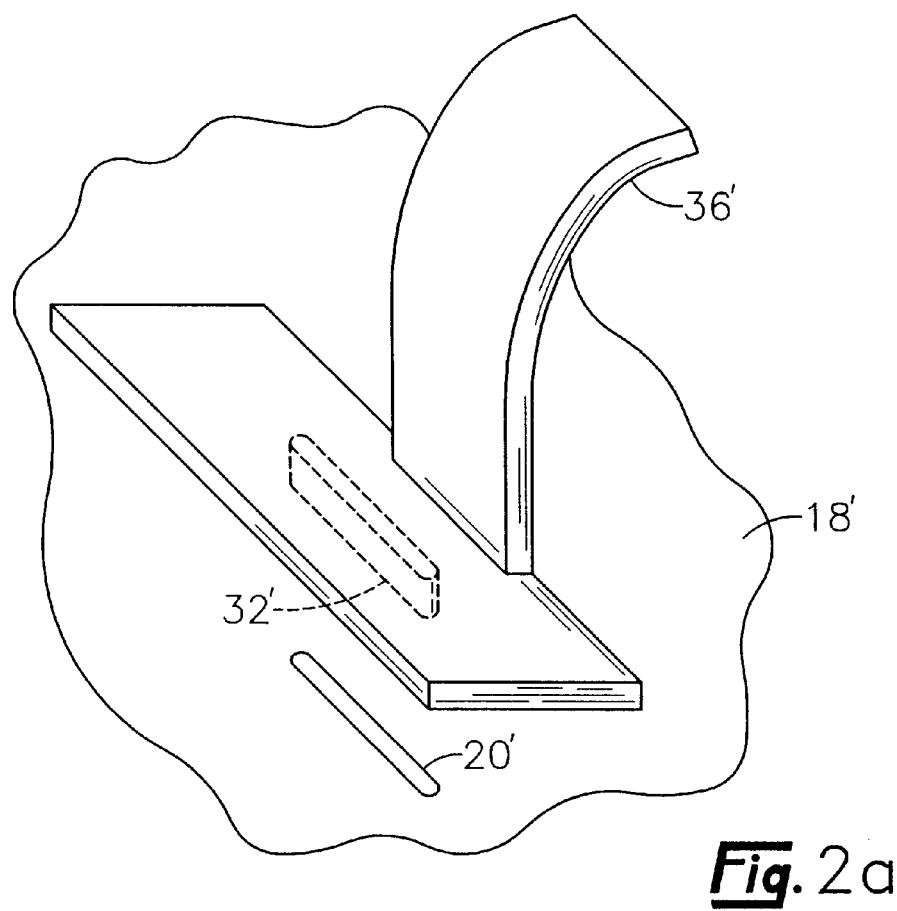

As shown in FIGS. 2a and 2b, the upstanding member 36 may be provided by shorter members 36' and 36", respectively. For example, member 36' is curved to extend toward the chute 12 when the support is installed and member 36" is angled toward the chute. As will be appreciated, these embodiments enable the provision of a more vertically compact support. Also, the embodiment of FIG. 2a has a rail 32' that extends down for mating with a corresponding slot provided in the deck of the mower in the event the mower deck 18' provides a slot 20' rather than the apertures 20a and 20b.

For the purpose of example only, the support 10 of FIG. 2 preferably has the following dimensions (FIGS. 3 and 4):

| Dimension | Approx. Distance (in) |
| --- | --- |
| a | 5.92 |
| b | 0.23 |
| c | 1.00 |
| d | 0.50 |
| e | 0.76 |
| f | 0.55 |
| g | 1.43 |
| h | 2.52 |
| i | 0.25 |
| j | 0.81 |
| k | 1.01 |
| l | 0.50 |
| m | 0.25 |

Figure 5:
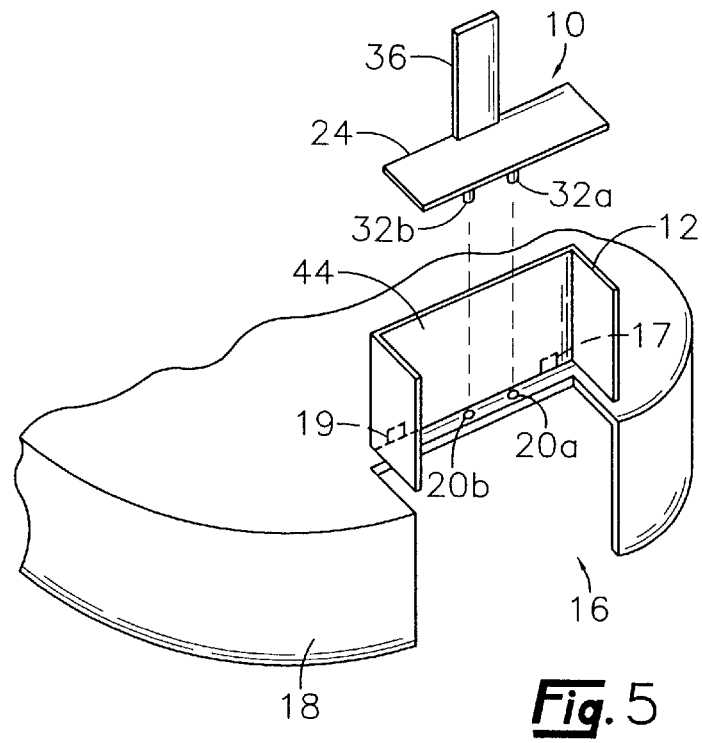
FIG. 5 is an exploded and enlarged view of a portion of FIG. 1.

As will be appreciated, the support 10 of the invention is uncomplicated in configuration and is readily and easily installed on many mowers without the need to modify the mower. For example, the support 10 may be quickly installed on a mower of the type having apertures 20a and 20b which are provided for installation of a grass catcher. To accomplish installation, the chute 12 is manually raised from a substantially horizontal orientation to a raised or substantially vertical orientation and the support 10 installed by simply positioning the pins 32a, 32b in the apertures 20a and 20b (FIG. 5). When installed in this manner, the surface 44 of the chute is urged against the vertical member 36 of the support by the springs associated with the hinges. As will be appreciated, the base 24 and the pins 32a, 32b cooperate to maintain the support 10 in the installed position on the deck 18, with the member 36 preventing the chute 12 from returning to its fully lowered position.

Installation of the chute support 10 thus advantageously enables a user to quickly and easily maintain the chute 12 in a raised position which conveniently renders the chute suitably positioned for maintenance work on the mower or for passage of the mower through a gate. Thereafter, the chute may be quickly returned to the lowered position by simply removing the chute support 10 as by lifting it to clear the pins 32a, 32b from the apertures 20a and 20b. As will be appreciated, no tools or special skills are required to install or remove the support 10 and installation and removal each takes only a few seconds. Also, the sturdy one-piece, no moving pieces construction of the support advantageously inhibits the opportunity to loose or damage parts.

Figure 6:
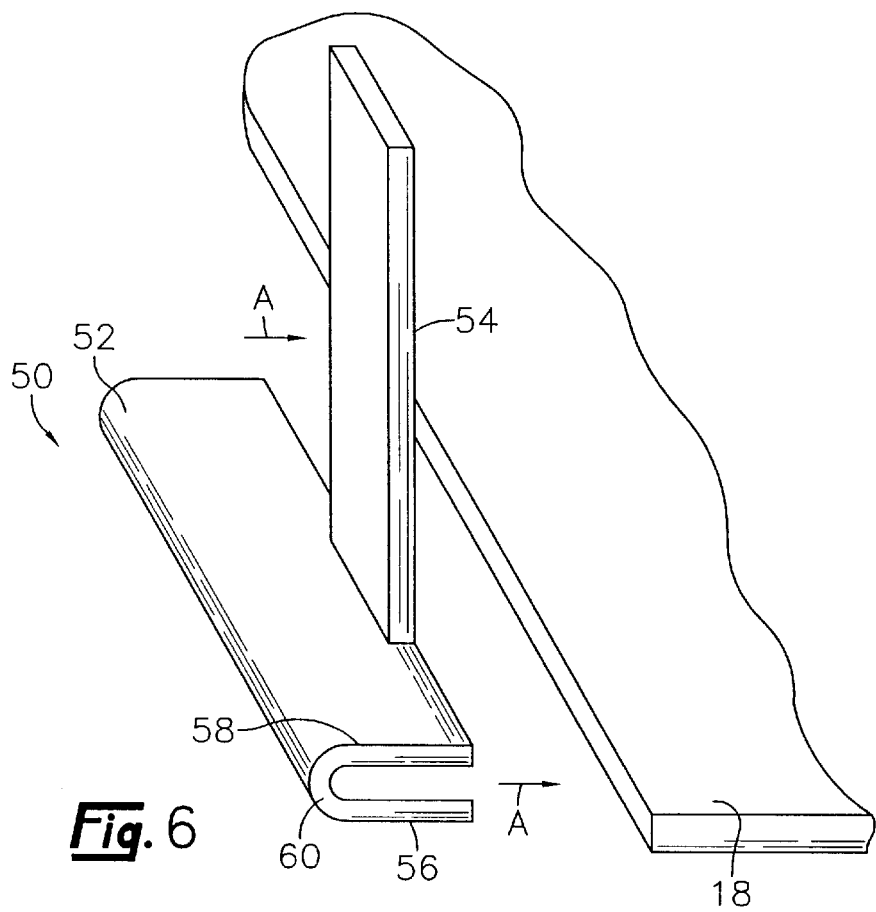
FIG. 6 is a perspective view of an alternate embodiment of a chute support in accordance with the invention.

Turning to FIG. 6, there is shown another embodiment of a chute support 50 having a base 52 and an upstanding member 54. As will be noticed, the base 52 is generally U-shaped in cross-section, having a pair of legs 56 and 58 connected by bend 60. This embodiment may be readily installed by sliding the legs over opposite sides of the deck 18 in the direction of the arrows A so that the bend 60 is adjacent the edge of the deck and the support 50 fittingly engages the deck of the mower. As will be appreciated, this embodiment is particularly suitable for manufacture in plastic, with the legs being spaced apart such that they bias against the deck when the support is installed.

The foregoing description of certain exemplary embodiments of the present invention has been provided for purposes of illustration only, and it is understood that numerous modifications or alterations may be made in and to the illustrated embodiments without departing from the spirit and scope of the invention as defined in the following claims.

What is claimed is:

1. A one-piece removably mountable support for use with a mower for maintaining a discharge chute hingedly connected to a deck of the mower adjacent a discharge opening of the deck in a raised position when the mower is not running, the support comprising:

a base having substantially flat upper and lower surfaces, and a front edge opposite a back edge;

a pair of spaced apart pins extending away from the lower surface of the base, the pins being spaced and configured for being removably received into apertures located on the deck of the mower; and an upstanding member extending away from the upper surface of the base for nonpivotably abutting the chute of the mower when it is in the raised position for maintaining the chute in the raised position when the support is installed on the mower, wherein the support is of one-piece construction and is removably mountable on the deck of the mower only when the chute is in a raised position.

2. The support of claim 1, wherein the base is substantially rectangular in cross-section.

3. The support of claim 1, wherein the pins are substantially circular in cross-section.

4. The support of claim 1, wherein the upstanding member is substantially rectangular in cross-section.

5. The support of claim 1, wherein the pins are perpendicular to the lower surface of the base.

6. The support of claim 1, wherein the upstanding member is perpendicular to the base.

7. The support of claim 1, wherein the upstanding member is substantially straight.

8. A one-piece removably mountable support for use with a mower for maintaining a discharge chute hingedly connected to a deck of the mower adjacent a discharge opening of the deck in a raised position when the mower is not running, the support comprising:

a base having a substantially flat upper surface and a substantially flat lower surface opposite the upper surface for contacting the deck of the mower;

connecting means integral with the base and configured for removably mounting the base adjacent the deck of the mower; and an upstanding member integral with the base and extending away from the upper surface of the base for nonpivotably abutting the chute of the mower when the chute is in the raised position for maintaining the chute in the raised position when the support is installed on the mower, wherein the support is of one-piece construction and has no moving parts and is removably mountable on the deck of the mower only when the chute is in a raised position.

9. The support of claim 8, wherein the connecting means comprises a pair of spaced apart pins extending away from the lower surface of the base, the pins being spaced and configured for being matingly received into apertures located on the deck of the mower.

10. The support of claim 9, wherein the pins are substantially circular in cross-section.

11. The support of claim 8, wherein the upstanding member is substantially rectangular in cross-section.

12. The support of claim 8, wherein the pins are perpendicular to the lower surface of the base.

13. The support of claim 8, wherein the upstanding member is perpendicular to the base.

14. The support of claim 8, wherein the upstanding member is substantially straight.

15. The support of claim 8, wherein the base comprises a pair of legs connected by a bend and the connecting means comprises a space between the legs adjacent the bend adapted to be positioned about the deck of the mower so that the support fittingly engages the deck of the mower.

* * * * *